(12) United States Patent
Oh

(10) Patent No.: US 8,088,489 B2
(45) Date of Patent: Jan. 3, 2012

(54) ARTIFICIAL MARBLE USING LOW SPECIFIC GRAVITY MATERIAL AS CHIP AND PROCESS FOR PREPARING THE SAME

(75) Inventor: Jae-Ho Oh, Gyeonggi-do (KR)

(73) Assignee: LG Chem, Ltd. (KR)

( * ) Notice: Subject to any disclaimer, the term of this patent is extended or adjusted under 35 U.S.C. 154(b) by 1143 days.

(21) Appl. No.: 11/666,191

(22) PCT Filed: Sep. 25, 2006

(86) PCT No.: PCT/KR2006/003796
§ 371 (c)(1),
(2), (4) Date: Apr. 24, 2007

(87) PCT Pub. No.: WO2007/142391
PCT Pub. Date: Dec. 13, 2007

(65) Prior Publication Data
US 2009/0117317 A1    May 7, 2009

(30) Foreign Application Priority Data

Jun. 2, 2006 (KR) .................. 10-2006-0049629
Jun. 9, 2006 (KR) .................. 10-2006-0051670

(51) Int. Cl.
*B32B 9/04* (2006.01)
*B32B 27/36* (2006.01)
*C09D 5/29* (2006.01)
(52) U.S. Cl. .................. 428/411.1; 428/412; 523/171
(58) Field of Classification Search .................. None
See application file for complete search history.

(56) References Cited

U.S. PATENT DOCUMENTS

| 6,028,127 | A | 2/2000 | Yanagase et al. |
| 6,936,643 | B1 | 8/2005 | Joussen et al. |
| 2007/0004824 | A1* | 1/2007 | Kim et al. ............ 523/171 |
| 2007/0049658 | A1* | 3/2007 | Choi ............ 523/171 |

(Continued)

FOREIGN PATENT DOCUMENTS

DE          19920719 A1     11/2000

(Continued)

OTHER PUBLICATIONS

Supplementary European Search Report, EP 06798879, dated Dec. 3, 2009.

(Continued)

*Primary Examiner* — Gordon R Baldwin
(74) *Attorney, Agent, or Firm* — Lerner, David, Littenberg, Krumholz & Mentlik, LLP

(57) ABSTRACT

An artificial marble using chips made of a low specific gravity material via a lamination or crunch technique to realize a natural stone-like texture, and a process for preparing the artificial marble are disclosed. In one example, a high specific gravity layer containing a high specific gravity inorganic filler is laminated on a low specific gravity layer made of a low specific gravity material to form a flat board, and then, the flat board is crushed to produce chips. In another example, low specific gravity regions made of a low specific gravity material is coated with a high specific gravity slurry containing a high specific gravity inorganic filler, to produce crunch chips. Thereby, a low specific gravity material, which could not be used conventionally, is applicable to the artificial marble, so as to achieve an outer appearance remarkably similar to a texture of natural marbles.

13 Claims, 2 Drawing Sheets

U.S. PATENT DOCUMENTS

2007/0243369 A1 * 10/2007 Park et al. .................. 428/304.4

FOREIGN PATENT DOCUMENTS

| EP | 0362884 A2 | 4/1990 |
| --- | --- | --- |
| EP | 0814066 A1 | 12/1997 |
| JP | 08208711 A | 8/1996 |
| JP | 09188555 A | 7/1997 |
| JP | 11-343156 A | 12/1999 |
| JP | 2001089213 A | 4/2001 |
| JP | 2001-205750 A | 7/2001 |
| JP | 3685116 B2 | 4/2003 |
| JP | 3648592 B2 | 5/2005 |
| KR | 20010084598 A | 2/2000 |
| KR | 10-0376605 B1 | 3/2003 |
| KR | 10-0491874 | 1/2004 |
| KR | 10-2004-0059913 A | 6/2004 |
| KR | 100555441 B1 | 2/2006 |
| KR | 100562634 B1 | 3/2006 |

OTHER PUBLICATIONS

Office Action from Taiwanese Application No. 96101153 citing search report with a completeion date of Jul. 29, 2010.

* cited by examiner

ARTIFICIAL MARBLE USING LOW SPECIFIC GRAVITY MATERIAL AS CHIP AND PROCESS FOR PREPARING THE SAME

CROSS-REFERENCE TO RELATED APPLICATIONS

This application is a national phase entry under 35 U.S.C. §371 of International Application No. PCT/KR2006/003796, filed Sep. 25, 2006, published in English, which claims priority from Korean Patent Application No. 10-2006-0049629 filed on Jun. 2, 2006 and Korean Patent Application No. 10-2006-0051670 filed on Jun. 9, 2006 in the Korean Intellectual Property Office, the disclosures of which are incorporated herein in their entirety by reference.

BACKGROUND OF THE INVENTION

The present invention relates to an artificial marble, which is prepared by use of chips containing a low specific gravity material (having a specific gravity of 0.2~2.0) to realize a natural stone-like texture, and a process for preparing the artificial marble. More particularly, the present invention relates to an artificial marble wherein a low specific gravity material, which could not be used in conventional artificial marbles, is used to constitute artificial marble chips having a relatively high specific gravity via a lamination or crunch technique, so as to achieve a texture remarkably similar to that of natural stone, and a process for preparing the artificial marble.

Artificial marbles refer collectively to artificial synthetic products prepared by blending natural stone powder and minerals with a resin component (acrylic, unsaturated polyester, epoxy, etc.) or cement and adding various kinds of pigments and additives to the blend so as to realize a natural stone-like texture. Representative artificial marbles include acrylic artificial marbles, unsaturated polyester artificial marbles, engineered stone artificial marbles, and the like.

Here, engineered stone artificial marbles are prepared by blending natural stone powder, quartz, glass, mirror, aluminum hydroxide, etc. as main materials with 15 wt % or less of resin, and hereinafter, referred to as "E-stone".

Most conventional artificial marble products generally have a single color, or a simple outer appearance using only few colors of chips. Much research for developing artificial marbles imitating the outer appearance of natural marbles has been carried out.

As known, low specific gravity materials, such as acrylic materials, etc., rise up above slurry due to a specific gravity difference when being used alone. Therefore, in the case of chips made of the low specific gravity materials, they may exhibit a separation from other chips having a relatively high specific gravity, thus making it impossible for artificial marble products to achieve a desired surface texture. For this reason, conventionally, low specific gravity materials could not be used in the preparation of artificial marbles.

Korean Patent Laid-open No. 2004-59913 discloses an acrylic artificial marble featuring the use of special chips each containing various colors of chips therein (referred to as "chip-in-chip"). However, the disclosed acrylic artificial marble is a mere combination of materials having specific gravities similar to one another for the sake of color effect, and has a problem of low transparency because of an inorganic filler contained in a composite thereof.

Korean Patent Registration No. 376605 discloses an artificial marble panel containing chips. In the disclosed artificial marble panel, a variety of chips having different specific gravities and colors from one another are dispersed in such a manner that low, medium, and high specific gravity chips are dispersed to a front surface, mid-portion, and backside of the panel, to diversify the pattern and color of the resulting panel. The above Patent, however, proposes to separate layers by differentiating the specific gravity of chips, unlike the present invention.

Korean Patent Registration No. 491874 discloses an artificial marble comprising: (A) 100 parts by weight of an artificial marble slurry containing 100 parts by weight of an acrylic resin syrup, 120~200 parts by weight of an inorganic filler, 2~10 parts by weight of a cross-linking agent, and 0.1~10 parts by weight of a polymerization initiator, and (B) 5~70 parts by weight of marble chips containing 100 parts by weight of an acrylic resin syrup, 100~150 parts by weight of an inorganic filler, 2~10 parts by weight of a cross-linking agent, and 0.1~10 parts by weight of a polymerization initiator, wherein the mixing rate of the inorganic filler in the artificial marble slurry is greater than that in the marble chips by 20~50 parts by weight. The artificial marble, disclosed in the above Patent, however, has deterioration in transparency because of the inorganic filler added in the marble chips.

Japanese Patent Registration No. 3648592 discloses an artificial marble using a variety of chips having different shapes and specific gravities from one another. The above Patent has no relation with utilization of low specific gravity materials for increasing the specific gravity of the materials as proposed by the present invention.

Japanese Patent Registration No. 3685116 discloses an artificial marble prepared by heating and curing a resin compound containing a heat-curable resin as a main component. The disclosed artificial marble has a feature in that a front surface thereof is formed of a non-foamed artificial marble layer and a backside thereof is formed of a foamed artificial marble layer having a lower density than that of the non-foamed artificial marble layer. In the case of the invention disclosed in the above Patent, although it shows an improvement in the installation of fasteners as well as the recycling, cutting, and other processes of the artificial marble by virtue of the foamed layer at the backside of the artificial marble, it has no relation with utilization of low specific gravity materials for increasing the specific gravity of the materials as proposed by the present invention.

Japanese Patent Laid-open No. 1999-343156 discloses a lightweight artificial marble prepared by blending 100 parts by weight of an artificial marble syrup with 20~180 parts by weight of a foamed inorganic particle-shaped material, which has a specific gravity of 0.5~1.5 and an average particle diameter of 3 mm or less, and heating and polymerizing the blend. Japanese Patent Laid-open No. 2001-335382 discloses a lightweight artificial marble composite comprising: 10~65 wt % of a polymerizable component containing methyl methacrylate as a main component, 30~85 wt % of an inorganic filler, and 0.1~10 wt % of an organic hollow filler having a specific gravity of 0.05~0.7 and an average particle diameter of 10~300 μm. The above-described patents deal with only a reduction in the weight of artificial marbles, and have no relation with utilization of low specific gravity materials for increasing the specific gravity of the materials as proposed by the present invention.

SUMMARY OF THE INVENTION

Therefore, the present invention has been made in view of the above problems, and it is an object of the present invention to provide an artificial marble wherein a variety of low specific gravity materials suitable to achieve a natural marblelike texture are usable to constitute artificial marble chips having a specific gravity similar to that of other single-color chips having a relatively high specific gravity, so as to achieve a surface texture remarkably similar to that of natural marbles as well as a high stability in physical properties without the risk of separation from the high specific gravity chips, and a process for preparing the artificial marble.

In accordance with an aspect of the present invention, the above and other objects can be accomplished by the provision of an artificial marble having a background region and chips, wherein the chips comprise high specific gravity chips obtained by use of a low specific gravity material having a lower specific gravity than that of the background region and a high specific gravity material having a higher specific gravity than that of the background region.

According to a first embodiment of the present invention, each of the high specific gravity chips may comprise: a high specific gravity layer made of the high specific gravity material to have a higher specific gravity than that of the background region; and a low specific gravity layer made of the low specific gravity material to have a lower specific gravity than that of the background region.

According to a second embodiment of the present invention, each of the high specific gravity chips may comprise: a high specific gravity region made of the high specific gravity material to have a higher specific gravity than that of the background region; and low specific gravity regions made of the low specific gravity material to have a lower specific gravity than that of the background region, and the low specific gravity regions may be uniformly distributed in the high specific gravity region as a background.

In the present invention, as a result of adding the high specific gravity material (having a specific gravity of 2.0 or more) to the low specific gravity material (having a specific gravity of 0.2~2.0), the artificial marble can be prepared by use of the high specific gravity chips having a specific gravity similar to that of general single-color chips included in the artificial marble.

The high specific gravity chips means chips obtained by adding a high specific gravity filler to a low specific gravity material, to thereby achieve a specific gravity similar to that of general single-color chips included in the artificial marble.

The present invention proposes to impart a high specific gravity to a low specific gravity material via a lamination or crunch technique. Specifically, the low specific gravity layer made of the low specific gravity material may be integrally formed with the high specific gravity layer made of the high specific gravity material with a lamination technique, or the low specific gravity regions may be coated with a high specific gravity slurry containing the high specific gravity filler via a crunch technique, so as to produce crunch-shaped chips. With the lamination or crunch technique, it is possible to impart a high specific gravity to the low specific gravity material, thereby eliminating a problem of a specific gravity difference with the artificial marble using the high specific gravity chips.

Preferably, the specific gravity of each high specific gravity chip may be equal to that of a material composite of the artificial marble using the high specific gravity chips, or may have a specific gravity difference of ±0.2 or less.

The present invention has a feature of reducing the specific gravity difference between the high specific gravity chips and the material composite of the artificial marble using the same. When the high specific gravity chips and the material composite have no specific gravity difference, i.e. have the same specific gravity as each other, or the specific gravity difference is less than 0.2, there is no separation of the chips from the material composite.

The present inventors had attempted to introduce a transparent low specific gravity material, such as acrylic resin, into a material composite of an artificial marble, in order to achieve a high transparency equivalent to that of quartz and high-purity silica included in natural stone, so as to realize an artificial marble close to natural stone in view of a pattern and color. However, they made a mistake of eliminating fillers in order to maintain the transparency of the low specific gravity material. This caused separation of chips due to a specific gravity difference when the low specific gravity material having a chip form is introduced into the artificial marble.

Generally, a plastic resin is a low specific gravity material having a specific gravity of 1.5 or less. For example, a transparent acrylic resin, such as poly-methylmethacrylate (PMMA), has a specific gravity of approximately 1.7~1.20. However, the material composite of the artificial marble generally has a specific gravity of approximately 1.4~1.8.

Due to a specific gravity difference between the transparent resin and the material composite of the artificial marble, when transparent chips made of the transparent resin are introduced into the artificial marble, the transparent chips may suffer from separation from the artificial marble. It is currently difficult to manufacture artificial marble products using the transparent chips because there is no transparent polymer having a high specific gravity of 1.6 or more.

In the present invention, by producing high specific gravity chips containing a transparent low specific gravity material, it is possible to minimize a specific gravity difference between the chips and the material composite of the artificial marble, thereby imparting a natural quartz-like outer appearance to an artificial marble product without the risk of separation of the transparent low specific gravity material.

Preferably, the whole specific gravity of the high specific gravity chips may be 1.3~2.0, and more particularly, 1.6~1.8, which is similar to that of the material composite of the artificial marble. To obtain the specific gravity of the high specific gravity chips, preferably, the specific gravity of the high specific gravity layer or high specific gravity region may be 1.5~10, and more particularly, 2.0~5.0. Also, the specific gravity of the low specific gravity layer or low specific gravity region may be 0.2~2.0, and more particularly, 1.5 or less.

The low specific gravity layer or low specific gravity region may form a transparent layer or transparent chip having a light transmissivity of 70~100%, and preferably, 95% or more. Conventional chips contain fillers, such as aluminum hydroxide, and are semitransparent chips having a light transmissivity of 60% or less. It should be noted that a transparency effect may be increased by regulating thickness even under the condition of a constant light transmissivity.

A base resin used in the high and low specific gravity layers or high and low specific gravity regions may be a transparent polymer resin, such as acrylic resin, unsaturated polyester resin, epoxy resin, polyvinyl chloride (PVC), polystyrene (PS), polycarbonate (PC), polyethylene terephthalate (PET), and styrene-methylmethacrylate (SMMA) copolymer resin, or the like. More preferably, the low specific gravity layer or low specific gravity region may form a transparent acrylic chip using an acrylic resin as a base resin.

According to the present invention, since transparent acrylic chips having a high light transmissivity and good physical properties are applicable to the high specific gravity layer or high specific gravity region, it is possible to achieve a natural quartz-like outer appearance while allowing the implementation of a post-process, such as casting and grinding, which could not be performed conventionally due to a specific gravity difference.

In the present invention, the high specific gravity layer or high specific gravity region contains a filler to regulate a specific gravity of the low specific gravity layer or low specific gravity region. Examples of proper fillers may include barium compounds, coal, stone powder, silica, titanium dioxide, aluminum hydroxide, calcium carbonate, metal powders, and metal salts. A specific gravity of the filler must be at least 2.5, and preferably, is 2.5~10. It is advantages to use high specific gravity fillers in order to increase specific gravity regulation effect with low amount of use thereof.

In the case of a final artificial marble product according to the first embodiment of the present invention, the high specific gravity layer may be removed by sanding, to expose the low specific gravity layer to the outside from a surface of the artificial marble, thereby achieving a unique outer appearance of the artificial marble by virtue of the transparent low specific gravity layer.

In the case of a final artificial marble product according to the second embodiment of the present invention, the high specific gravity region may be partially removed by sanding, to expose the low specific gravity regions to the outside from a surface of the artificial marble, thereby achieving a unique outer appearance by virtue of the transparent low specific gravity region.

The shape of the high specific gravity chips is not specially limited, and for example, may have a cylindrical shape, or polyhedral shape including a tetrahedral shape, hexahedral shape, or the like. Generally, the high specific gravity chip may have a hexahedral shape.

In consideration of the outer appearance and processability thereof, the high specific gravity chips may have a size of 0.5 mm~20 mm, and the input amount of the high specific gravity chips may be 0.1~100 parts by weight on the basis of 100 parts by weight of the material composite of the artificial marble.

The artificial marble may be an acrylic artificial marble, unsaturated polyester artificial marble, or engineered stone artificial marble. The engineered stone artificial marble may be prepared by blending natural stone powder, quartz, glass, mirror, aluminum hydroxide, etc. as main materials with 15 wt % or less of resin.

In accordance with another aspect of the present invention, the above and other objects can be accomplished by the provision of a process for preparing an artificial marble comprising: producing a flat board for forming a low specific gravity layer having a lower specific gravity than that of the artificial marble; producing a flat board for forming a high specific gravity layer having a higher specific gravity than that of the artificial marble, and laminating the high specific gravity layer flat board on the low specific gravity layer flat board; crushing the laminated flat boards, to produce high specific gravity chips consisting of the low specific gravity layer and high specific gravity layer; and introducing the high specific gravity chips into the artificial marble.

In accordance with yet another aspect of the present invention, the above and other objects can be accomplished by the provision of a process for preparing an artificial marble comprising: producing chips for forming low specific gravity regions having a lower specific gravity than that of the artificial marble; blending the low specific gravity region chips with a composite for forming a high specific gravity region having a higher specific gravity than that of the artificial marble; forming the blend to have a flat board shape, and crushing the formed flat board, to produce high specific gravity chips including the low specific gravity regions uniformly distributed in the high specific gravity region as a background; and introducing the high specific gravity chips into the artificial marble.

A specific gravity of the high specific gravity chips may be regulated to be equal to, or approach that of a material composite of the artificial marble by regulating a specific gravity and amount of a filler to be added to the high specific gravity layer flat board or high specific gravity region composite.

According to the first embodiment of the present invention, a specific gravity of the high specific gravity chips may be regulated to be equal to, or approach that of a material composite of the artificial marble by regulating thicknesses of the high specific gravity layer flat board and low specific gravity layer flat board. Through the regulation of the thickness, it is possible to prevent separation between the high specific gravity layer and low specific gravity layer.

According to the second embodiment of the present invention, a thickness of a mold for the flat board may be regulated to be similar to a maximum diameter of the low specific gravity region chips during the production of the flat board for forming the high specific gravity chips. This is effective to prevent the chips for forming the low specific gravity regions from clustering in the high specific gravity crunch chips.

According to the first embodiment of the present invention, after curing the artificial marble, the high specific gravity layer is partially or wholly removed by sanding, thereby exposing the low specific gravity layer to the outside from a surface of the artificial marble. This is effective to achieve a unique outer appearance of the artificial marble by virtue of the transparent low specific gravity layer.

According to the second embodiment of the present invention, after curing the artificial marble, the high specific gravity region is partially removed by sanding, to expose the low specific gravity regions to the outside from a surface of the artificial marble. This is effective to achieve a unique outer appearance of the artificial marble by virtue of the transparent low specific gravity region.

Each of the flat boards may be cured by a casting method, press method, vibrator method, or UV curing method.

According to the present invention, through the use of a material, such as a transparent acrylic resin, having a lower specific gravity than that of a slurry used to prepare the artificial marble, it is possible to apply various kinds of materials to the preparation of the artificial marble, thereby realizing an outer appearance remarkably similar to a texture of natural marbles.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Now, the present invention will be described in detail with reference to the accompanying drawings.

Figure 1:
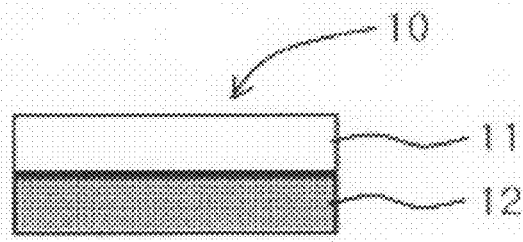
FIG. 1 is a sectional view of a high specific gravity chip according to a first embodiment of the present invention.

FIG. 1 is a sectional view of a high specific gravity chip according to a first embodiment of the present invention. As shown in FIG. 1, the high specific gravity chip 10 includes a low specific gravity layer 12 and a high specific gravity layer 11.

Although the high specific gravity chip 10 preferably has a hexahedral shape, it is not limited thereto, and may have a cylindrical or tetrahedral shape, or the like. Also, the high specific gravity chip 10 may have a regular or irregular shape.

A lamination structure of the high specific gravity chip 10 is not limited to a double-layer structure as shown in the drawing. Alternatively, the high specific gravity chip 10 may have a multilayer structure including a plurality of low specific gravity layers 12 and high specific gravity layers 11. In the case of the multilayer structure, the low specific gravity layers 12 and high specific gravity layers 11 may be laminated alternately in at least a part of the high specific gravity chip 10.

Figure 2:
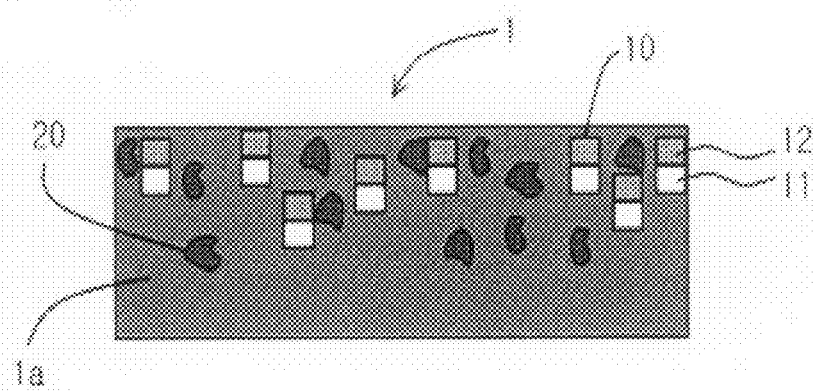
FIG. 2 is a sectional view of an artificial marble using the high specific gravity chips according to the first embodiment of the present invention.

FIG. 2 is a sectional view of an artificial marble using the high specific gravity chips according to the first embodiment of the present invention. As shown in FIG. 2, the artificial marble 1 includes a background region 1a and chips. The chips of the artificial marble 1 include the high specific gravity chips 10 according to the present invention and general single-color chips 20.

The high specific gravity chips 10 are basically made of a low specific gravity material having a lower specific gravity than that of the background region 1a, but also contain a high specific gravity material having a higher specific gravity than that of the background region 1a, so as to achieve a relatively high specific gravity. Specifically, the high specific gravity chips 10 include the high specific gravity layer 11 made of the high specific gravity material to have a higher specific gravity than that of the background region 1a, and the low specific gravity layer 12 made of the low specific gravity material to have a lower specific gravity than that of the background region 1a.

As can be seen from FIG. 2, the high specific gravity chips 10 have substantially no specific gravity difference from the background region 1a and thus, are uniformly distributed without the risk of separation from the general single-color chips 20. Preferably, in view of an improvement in the outer appearance of the artificial marble 1 and a simplified preparation process, the specific gravity of the high specific gravity chips 10 is slightly higher than that of the background region 1a so that the high specific gravity chips 10 can be distributed near a surface of the artificial marble 1. The high specific gravity chips 10 have a regular arrangement in a surface direction of the artificial marble 1 as shown in the drawing by virtue of the high specific gravity layer 11 thereof.

Figure 3:
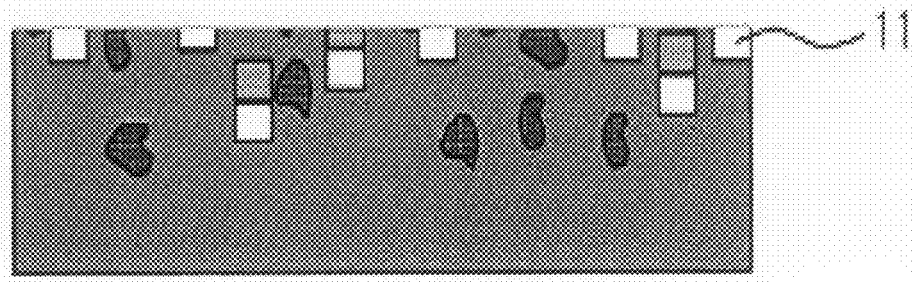
FIG. 3 is a sectional view of the artificial marble shown in FIG. 2 after sanding.

FIG. 3 is a sectional view of the artificial marble shown in FIG. 2 after sanding. As a result of removing the high specific gravity layer 11 partially or wholly by sanding, the transparent low specific gravity layer 12 is exposed to the outside, so as to impart a unique and high-quality outer appearance to the artificial marble.

Figure 4:
FIG. 4 is a photograph illustrating a surface of the artificial marble according to the first embodiment of the present invention.

FIG. 4 is a photograph illustrating a surface of the artificial marble according to the first embodiment of the present invention. It can be confirmed from FIG. 4 that the artificial marble according to the first embodiment of the present invention has an outer appearance remarkably similar to a texture of natural marble.

A process for preparing the artificial marble according to the first embodiment of the present invention comprises an operation for producing the high specific gravity chips and an operation for preparing the artificial marble using the same. In turn, the operation for producing the high specific gravity chips comprises an operation for producing flat boards to form the low and high specific gravity layers, a laminating operation, and a crushing operation.

The artificial marble flat boards for use in the production of the high specific gravity chips are obtained by curing a compound of a polymerizable resin, inorganic filler, etc. Here, it is noted that the flat board for forming the low specific gravity layer contains no inorganic filler.

The flat board for forming the low specific gravity layer is produced by curing a low specific gravity material (having a specific gravity of 0.2~2.0) to have a flat board shape. Although all of general transparent resins are usable as the low specific gravity material, high transparency resins, such as PMMA, PC, etc., are preferable in consideration of physical properties and outer appearance effects. The transparent flat boards have no limit in their production methods.

When transparent resins are used to constitute the low specific gravity layer, however, there is a problem in that the resulting low specific gravity layer may float toward a backside of an artificial marble during curing because of a large specific gravity difference with the material composite of the artificial marble, thus failing to impart an improved outer appearance to a surface of the product. Here, the surface of the product denotes a surface to come into contact with a steel belt, and the backside of the product denotes a surface to come into contact with air. To solve the above-described problem, the flat board for forming the low specific gravity layer is integrated with the high specific gravity layer using a high specific gravity filler.

The flat board for forming the high specific gravity layer is produced by curing a slurry containing 100 parts by weight of a base resin syrup, 50~1500 parts by weight of an inorganic filler, 0.1~10 parts by weight of a cross-linking agent, 0.1~10 parts by weight of a polymerization initiator, and 0.1~5 parts by weight of a pigment.

The inorganic filler used in the high specific gravity layer is a high specific gravity material (having a specific gravity of 2.0 or more), such as barium compounds, coal, stone powder, silica powder, etc.

The production and lamination order of the respective flat boards are not limited to special manners, and the respective flat boards are curable by a generally used casting, press, vibrator, UV curing method, etc.

Each of the high and low specific gravity layers may take the form of a multilayer including two or more layers. For example, a single low specific gravity layer may be integrally formed with one to three high specific gravity layers.

Based on a selected size of the high specific gravity chips, it is necessary to regulate thicknesses of both the high and low specific gravity layers, to prevent separation between the high specific gravity layer and low specific gravity layer during crushing.

If the flat boards are completely produced and laminated one above another, the laminated flat boards are crushed to produce the high specific gravity chips. Thereby, the artificial marble can be prepared by use of the high specific gravity chips.

FIG. 2 illustrates a pattern of the artificial marble obtained when general single-color chips are used along with the above described high specific gravity chips, and FIG. 3 illustrates a pattern of the artificial marble after sanding.

Figure 5:
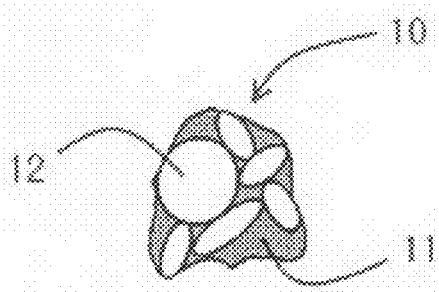
FIG. 5 is a sectional view of a high specific gravity crunch chip according to a second embodiment of the present invention.

FIG. 5 is a sectional view of a high specific gravity crunch chip according to a second embodiment of the present invention. As shown in FIG. 5, the high specific gravity crunch chip 10 is configured in such a manner that chip-shaped low specific gravity regions 12 are uniformly distributed in a high specific gravity region 11 as a background. Such a crunch chip structure can be easily understood from cookies, for example, grains, such as almonds, imbedded in a base material, such as chocolate, etc.

The shape of the high specific gravity crunch chip 10 is not specially limited. For example, the high specific gravity crunch chip 10 may have a hexahedral or cylindrical shape, or the like, and may have a regular or irregular shape.

Figure 6:
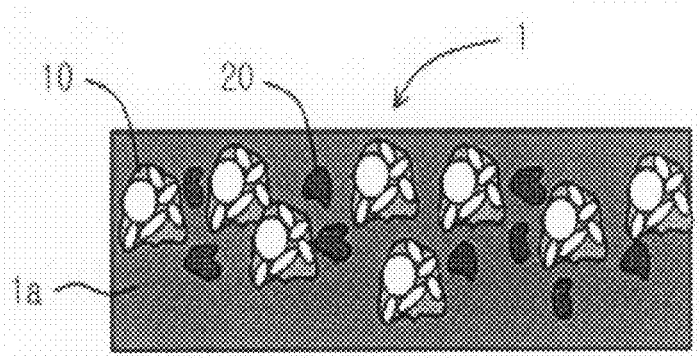
FIG. 6 is a sectional view of an artificial marble using the high specific gravity crunch chips according to the second embodiment of the present invention.

FIG. 6 is a sectional view of an artificial marble using the high specific gravity crunch chip according to the second embodiment of the present invention. As shown in FIG. 6, the artificial marble 1 includes the background region 1a and chips. The chips of the artificial marble 1 include the high specific gravity crunch chips 10 according to the present invention and general single-color chips 20.

The high specific gravity crunch chips 10 are produced by use of a low specific gravity material having a lower specific gravity than that of the background region 1a as well as a high specific gravity material having a higher specific gravity than that of the background region 1a. Specifically, the high specific gravity crunch chips 10 include the high specific gravity region 11 made of the high specific gravity material to have a higher specific gravity than that of the background region 1a, and the low specific gravity regions 12 made of the low specific gravity material to have a lower specific gravity than that of the background region 1a. Here, the chip-shaped low specific gravity regions 12 are uniformly distributed in the high specific gravity region 11 as a background.

As can be seen from FIG. 6, the high specific gravity crunch chips 10 have substantially no specific gravity difference from the background region 1a and thus, are uniformly distributed without the risk of separation from the general single-color chips 20. Preferably, in view of an improvement in the outer appearance of the artificial marble 1 and a simplified preparation process, the specific gravity of the high specific gravity crunch chips 10' is slightly higher than that of the background region 1a so that the high specific gravity crunch chips 10 can be distributed near a surface of the artificial marble 1.

Figure 7:
FIG. 7 is a sectional view of the artificial marble shown in FIG. 6 after sanding.

FIG. 7 is a sectional view of the artificial marble shown in FIG. 6 after sanding. As a result of removing the high specific gravity region 11 partially by sanding, the transparent low specific gravity layers 12 are exposed to the outside, so as to impart a unique and high-quality outer appearance to the artificial marble.

Figure 8:
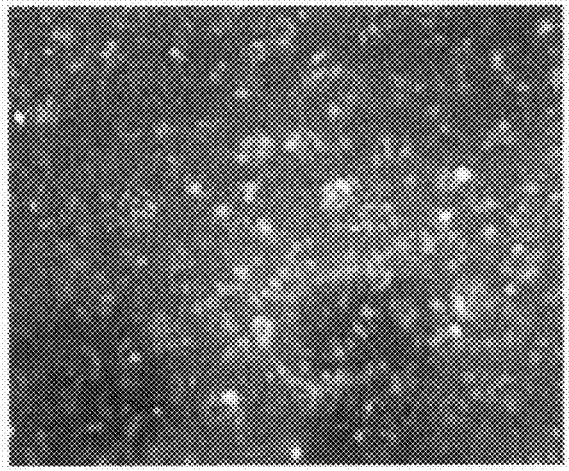
FIG. 8 is a photograph illustrating a surface of the artificial marble according to the second embodiment of the present invention.

FIG. 8 is a photograph illustrating a surface of the artificial marble according to the second embodiment of the present invention. It can be confirmed from FIG. 8 that the artificial marble according to the second embodiment of the present invention has an outer appearance remarkably similar to a texture of natural marble.

A process for preparing the artificial marble according to the second embodiment of the present invention comprises an operation for producing the high specific gravity crunch chips and an operation for preparing the artificial marble using the same. In turn, the operation for producing the high specific gravity crunch chips comprises an operation for producing chips forming the low specific gravity regions, a crunch chip producing operation, and a crushing operation.

Flat boards for producing the high specific gravity crunch chips of the artificial marble are obtained by curing a compound of a polymerizable resin, inorganic filler, etc. Here, it is noted that the flat board for forming the low specific gravity regions contains no inorganic filler.

The chips for forming the low specific gravity regions are produced by curing a low specific gravity material (having a specific gravity of 0.2~2.0) to have a flat board shape and crushing the resulting flat board.

When transparent resins are used to constitute the chips for forming the low specific gravity regions, however, there is a problem in that the resulting chips may float toward a backside of an artificial marble during curing because of a great specific gravity difference with the material composite of the artificial marble, thus failing to impart an improved outer appearance to a surface of the product. To solve the above-described problem, the chips for forming the low specific gravity regions are imbedded in a high specific gravity slurry using a high specific gravity filler, to have a crunch chip structure.

A composite for forming the high specific gravity region comprises 100 parts by weight of a base resin syrup, 50~1500 parts by weight of an inorganic filler, 0.1~10 parts by weight of a cross-linking agent, 0.1~10 parts by weight of a polymerization initiator, and 0.1~5 parts by weight of a pigment.

The inorganic filler used in the high specific gravity region composite is a high specific gravity material (having a specific gravity of 2.0 or more), such as barium compounds, coal, stone powder, silica powder, etc.

The high specific gravity crunch chips are produced by blending the composite for forming the high specific gravity region with 50~500 parts by weight of the chips for forming the low specific gravity regions, curing the blend to have a flat board shape, and crushing the resulting flat board.

In this case, by regulating a thickness of a mold of the flat board for forming the high specific gravity crunch chips so as to be equal to a maximum diameter of the chips for forming the low specific gravity regions, a viscosity of the composite for forming the high specific gravity region can be regulated. This is effective to prevent the chips for forming the low specific gravity regions from clustering in the high specific gravity crunch chips.

The flat board is curable by a generally used casting, press, vibrator, UV curing method, etc.

FIG. 6 illustrates a pattern of the artificial marble obtained when general single-color chips are used along with the above described high specific gravity crunch chips, and FIG. 7 illustrates a pattern of the artificial marble after sanding.

Example 1

A flat board for forming a transparent low specific gravity layer was produced by use of acrylic resin (specific gravity: 1.19, light transmissivity: 95%), and then, a flat board for forming a high specific gravity layer (specific gravity: 3.175) was produced by use of a slurry containing 100 parts by weight of acrylic resin and 150 parts by weight of barium sulfate as a high specific gravity filler (specific gravity: 4.499). Then, the high specific gravity layer flat board was laminated on the transparent low specific gravity layer flat board. By crushing the laminated flat boards, high specific gravity chips were produced.

The specific gravity of the produced high specific gravity chips was 1.65. When using 10 wt % of the high specific gravity chips to prepare an artificial marble, the high specific gravity chips showed only a slight specific gravity difference of +0.1 with other general single-color chips, and good artificial marble products having no risk of separation between the high specific gravity chips and other general single-color chips could be obtained.

Example 2

A transparent low specific gravity flat board was produced by use of acrylic resin (specific gravity: 1.19, light transmissivity: 95%). Subsequently, by crushing the flat board, transparent low specific gravity chips were produced. Then, a flat board for forming high specific gravity chips was produced by blending 110 parts by weight of the transparent low specific gravity chips with a slurry (specific gravity: 3.175) containing 100 parts by weight of acrylic resin and 160 parts by weight of barium sulfate as a high specific gravity filler (specific gravity: 4.499) while adding a curing agent and additive. Subsequently, the flat board for forming high specific gravity chips was crushed, to produce high specific gravity crunch chips.

The specific gravity of the prepared high specific gravity crunch chips was 1.64. When using 10 wt % of the high specific gravity crunch chips to prepare an artificial marble, the high specific gravity crunch chips showed only a slight specific gravity difference of ±0.1 with other general single-color chips, and good artificial marble products having no risk of separation between the high specific gravity crunch chips and other general single-color chips could be obtained.

As apparent from the above description, the present invention provides an artificial marble, which can be prepared by use of a low specific gravity material such as a transparent acrylic material, etc. Specifically, the low specific gravity material has a lower specific gravity than that of slurry that is generally used to prepare the artificial marble. With the use of the low specific gravity material, it is possible to allow the artificial marble to have an outer appearance remarkably similar to a texture of natural marbles.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An artificial marble comprising chips, wherein each of the chips comprises:
a high specific gravity layer or high specific gravity regions made of a high specific gravity material having a higher specific gravity than that of a raw material composite of the artificial marble; and
a low specific gravity layer or low specific gravity regions made of a low specific gravity material having a lower specific gravity than that of the raw material composite of the artificial marble,
wherein the low specific gravity layer or the low specific gravity regions contain no inorganic filler and are transparent having a light transmissivity of from 70 to 100%.

2. The artificial marble according to claim 1, wherein the specific gravity of each of the chips is equal to that of the raw material composite of the artificial marble or differs from that of the raw material composite of the artificial marble by ±0.2 or less.

3. The artificial marble according to claim 1, wherein the specific gravity of the chips is from 1.3 to 2.0.

4. The artificial marble according to claim 1, wherein the specific gravity of the high specific gravity layer or the high specific gravity regions is from 1.5 to 10.

5. The artificial marble according to claim 1, wherein the specific gravity of the low specific gravity layer or the low specific gravity regions is from 0.2 to 2.0.

6. The artificial marble according to claim 1, wherein the high specific gravity layer, the high specific gravity regions, the low specific gravity layer, or the low specific gravity regions comprise a base resin selected from the group consisting of acrylic resin, unsaturated polyester resin, epoxy resin, polyvinyl chloride (PVC) resin, polystyrene (PS) resin, polycarbonate (PC) resin, polyethylene terephthalate (PET) resin, and styrene-methylmethacrylate (SMMA) copolymer resin.

7. The artificial marble according to claim 1, wherein the low specific gravity layer or the low specific gravity regions comprise a base resin comprising an acrylic resin.

8. The artificial marble according to claim 1, wherein the high specific gravity layer or the high specific gravity regions contain a filler having a specific gravity of from 2.5 to 10.

9. The artificial marble according to claim 8, wherein the filler is selected from the group consisting of barium compounds, coal, stone powder, silica, titanium dioxide, aluminum hydroxide, calcium carbonate, metal powder, and metal salts.

10. The artificial marble according to claim 1, wherein the high specific gravity layer or the high specific regions comprise a sanded surface, whereby the low specific gravity layer is exposed to the outside from a surface of the artificial marble.

11. The artificial marble according to claim 1, wherein the chips have a size of from 0.5 to 20 mm.

12. The artificial marble according to claim 1, wherein the amount of the chips is from 0.1 to 100 parts by weight on the basis of 100 parts by weight of the raw material composite of the artificial marble.

13. The artificial marble according to claim 1, wherein the artificial marble is selected from the group consisting of an acrylic artificial marble, unsaturated polyester artificial marble, and engineered stone artificial marble.

* * * * *